UNITED STATES PATENT OFFICE.

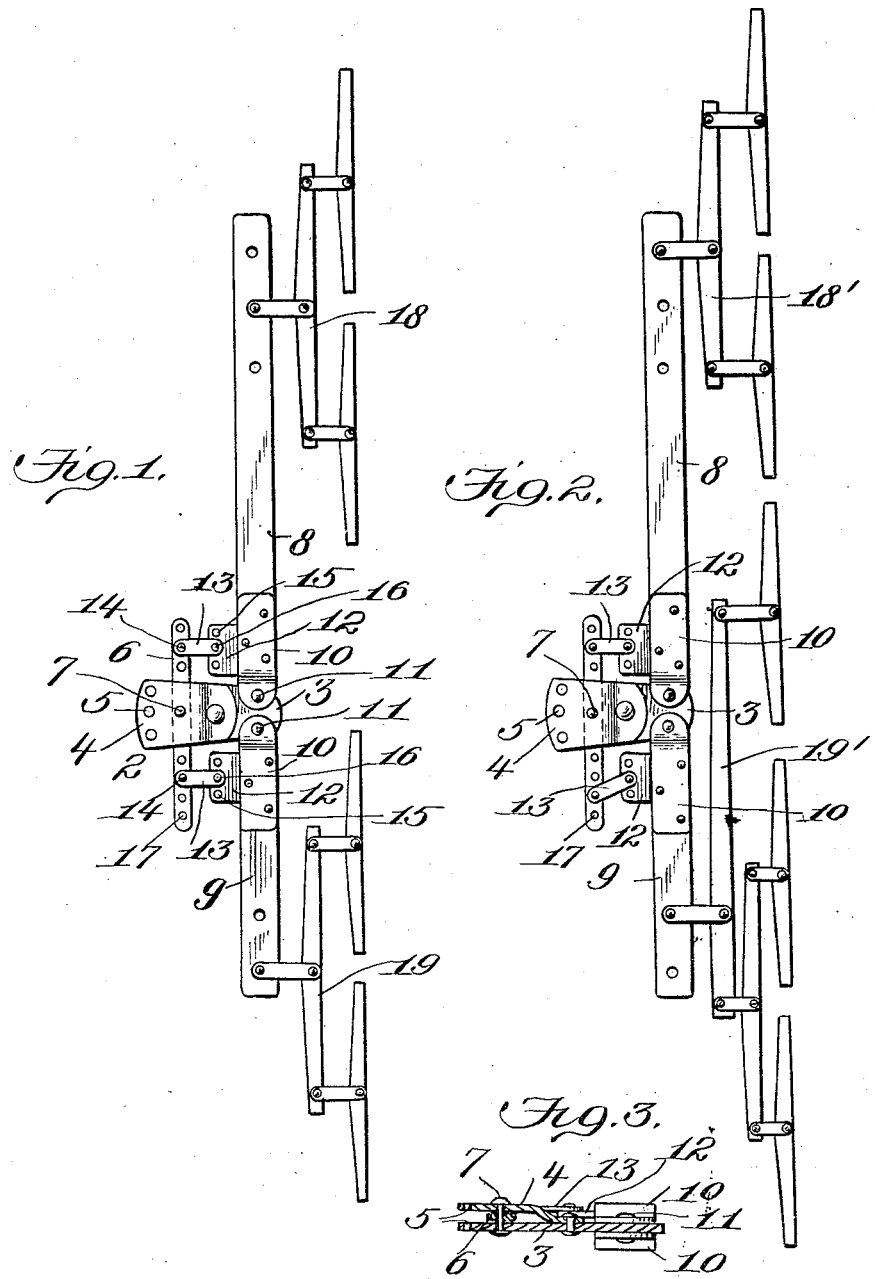

FRANKLIN B. STOUT, OF BALTIC, SOUTH DAKOTA.

DRAFT-EQUALIZER.

No. 870,480.	Specification of Letters Patent.	Patented Nov. 5, 1907.

Application filed December 22, 1906. Serial No. 349,106.

*To all whom it may concern:*

Be it known that I, FRANKLIN B. STOUT, a citizen of the United States, residing at Baltic, in the county of Minnehaha and State of South Dakota, have invented new and useful Improvements in Draft-Equalizers, of which the following is a specification.

This invention relates to draft equalizers, the object of the invention being to provide a simple and effective device of this character which can be put to many advantageous uses, certain of which are in connection with a single or a gang plow.

By the employment of the device an even, steady draft can be applied to the plow or other implement, whether four or five, or other number of horses be utilized.

In the drawings accompanying and forming part of this specification I illustrate in detail one form of embodiment of the invention which to enable those skilled in the art to practice said invention will be set forth fully in the following description, while the novelty of said invention will be included in the claims succeeding said description.

Referring to said drawings, Figure 1 is a top plan view of a draft equalizer embodying my invention and showing the manner of connecting four horses therewith. Fig. 2 is a similar view of said equalizer showing the manner of connecting five horses therewith. Fig. 3 is a sectional detail of the coupling device shown in the preceding views.

Like characters refer to like parts throughout the several figures.

The equalizer shown in the drawings includes in its construction a coupling device as that denoted in a general way by 2. This coupling member is represented as including in its construction a plate as 3 upon which is mounted an upper plate as 4. The upper plate is not as long as the lower plate, the front portion of the latter extending forwardly beyond the corresponding portion of the upper plate. The two plates 3 and 4 are rigidly connected together in any desirable manner as by rivets, screws, bolts or the like. In fact, they might be integral and constitute the branches of a coupling member, for as will be understood the rear portions of the two plates constitute branches of a coupling member as that denoted by 2. The two plates are shown as having near their rear edges perforations which register respectively with each other and each of which is designated by 5.

When it is desired to connect the equalizer with a single-beam plow the clevis thereof will be introduced into the space between the two plates 3 and 4 and a bolt or other suitable device will be passed through the two central registering perforations 5 and through said clevis. When it is desired to connect the forked or bifurcated member 2 with a gang plow the clevises of the two beams will be introduced into the space between the said two plates 3 and 4 and bolts will be passed through the outer registering perforations 5 and also through the two-beam clevises. The coupling member therefore is of such character that it may be readily connected either with a plow having one or a plurality of beams.

An evener bar is shown at 6 and as fulcrumed between its ends for swinging movement in the space between the two plates 3 and 4, a pivot 7 being shown for connecting the evener bar 6 with the coupling member. I have shown two equalizing bars as operative with the coupling mechanism, one of such bars, or that denoted by 8, being longer than the companion bar 9. To the inner portions of these equalizing bars 8 and 9 and on the upper and lower sides thereof, I prefer to rigidly fasten plates, each denoted by 10 and which extend inwardly beyond the inner ends of the two bars 8 and 9. These plates 10, as will be evident, are disposed in pairs and each pair straddles the front end of the coupling member, pivots, each designated by 11, passing through the respective plates and coupling member, thereby to permit swinging movement of the two equalizing bars with respect to the coupling member. The plates 10 are, of course, continuations of the two bars 8 and 9 and reinforce said bars or prevent wear which would occur were the wooden bodies of the bars to be directly connected with the coupling member. The upper plates of those marked 10 are provided with rearwardly extending arms as 12 to which are represented as connected two pairs of links each designated by 13, the respective pairs of links being located at opposite sides of the coupling member 2. The front ends of the said pairs of links straddling the arms 12 and also the evener bar or lever 6 and are preferably adjustably connected with the respective parts. This adjustment may be secured by pins as 16 on the front ends of the pairs of links 13 adapted to enter any one of a series of perforations as 15 arranged in a row on the arms 12 and by pins as 14 on the rear ends of the two pairs of links adapted to enter any one of rows of perforations as 17 on the evener bar 6 at opposite sides of the pivot 7 thereof.

In Fig. 1 I have shown the equalizer as having connected therewith two two-draft doubletrees designated respectively by 18 and 19, the doubletree 18 being connected with the equalizing bar 8, while the doubletree 19 is connected with the equalizing bar 9. In Fig. 2 I have shown a two-draft doubletree as 18′ connected with the long equalizing bar 8, while I have shown a three-draft doubletree 19′ connected with the short equalizing bar 9. To provide for the proper connection of these doubletrees with the equalizing bars 8 and 9 in accordance with the number of animals used, each of the said bars 8 and 9 has therein near the outer portion thereof several perforations into which bolts or other connecting devices can be inserted to connect the proper and suitable doubletrees therewith.

A draft equalizer involving my invention is simple in construction and effective in action. By it as previously stated four or five horses may be utilized. In fact this number may be varied. In case four horses are employed or in case five horses are employed one of either group can travel in the furrow, while the other three or four, as the case may be, can travel along the stubble.

What I claim is:

1. In a draft equalizer, a coupling member consisting of lower and upper plates suitably connected together and having series of registering perforations and spaced apart to receive the clevis of a plow, an evener fitted in the space between the plates and pivoted to the coupling member, equalizing bars provided with plates having rearwardly extending arms, said latter plates being pivoted to the lower plate of the coupling member forward of the evener, said arms and evener having series of perforations at opposite sides of the coupling member, links, and pins connecting the links with the evener and said arms and adapted to fit the respective perforations.

2. In a draft equalizer, a coupling member consisting of lower and upper plates suitably connected together and spaced apart to receive the clevis of a plow, one of the plates having a portion extending forwardly beyond the other plate, an evener fitted in the space between the plates and pivoted to the coupling member, equalizing bars provided with plates at their inner portions, having rearwardly extending arms, said latter plates being pivoted to the forwardly extending portion of the coupling member and forward of the evener, and links connected with the evener at opposite sides of the coupling member and also connected with said arms.

In testimony whereof I have hereunto set my hand in presence of two subscribing witnesses.

FRANKLIN B. STOUT.

Witnesses:
   M. J. VINYNESS,
   H. S. SANDVIG.